US006575076B1

(12) United States Patent
Achten

(10) Patent No.: US 6,575,076 B1
(45) Date of Patent: Jun. 10, 2003

(54) HYDRAULIC INSTALLATIONS

(75) Inventor: Peter A. J. Achten, Eindhoven (NL)

(73) Assignee: Innas Free Piston B.V., Breda (NL)

( * ) Notice: Subject to any disclaimer, the term of this patent is extended or adjusted under 35 U.S.C. 154(b) by 63 days.

(21) Appl. No.: 09/641,637

(22) Filed: Aug. 16, 2000

Related U.S. Application Data

(63) Continuation of application No. 09/125,337, filed as application No. PCT/NL97/00084 on Feb. 24, 1997, now Pat. No. 6,116,138.

(30) Foreign Application Priority Data

Feb. 23, 1996 (NL) ............................................ 1002430

(51) Int. Cl.[7] ............................ F01B 1/00; F16D 31/02
(52) U.S. Cl. ............................... 91/6.5; 91/472; 60/419
(58) Field of Search ............................... 60/419; 91/6.5, 91/472, 520; 417/225

(56) References Cited

U.S. PATENT DOCUMENTS

| | | | | | |
|---|---|---|---|---|---|
| 2,642,809 | A | * | 6/1953 | Born et al. | 417/270 |
| 2,933,897 | A | | 4/1960 | Toutant | |
| 3,175,508 | A | * | 3/1965 | Smithson | 91/6.5 |
| 3,188,963 | A | | 6/1965 | Tyler | |
| 3,223,047 | A | | 12/1965 | Toy | |
| 3,627,451 | A | | 12/1971 | Kouns | |
| 4,026,107 | A | * | 5/1977 | Kosek et al. | 60/419 X |
| 4,077,746 | A | | 3/1978 | Reynolds | |
| 4,373,669 | A | * | 2/1983 | Swanson | 60/486 X |
| 4,553,391 | A | * | 11/1985 | Reinhardt | 60/419 X |
| 4,693,080 | A | * | 9/1987 | Van Hooff | 60/414 |
| 5,035,170 | A | | 7/1991 | Stroze et al. | |
| 5,568,766 | A | * | 10/1996 | Otremba et al. | 60/413 X |
| 6,116,138 | A | * | 9/2000 | Achten | 60/419 X |

FOREIGN PATENT DOCUMENTS

| | | | |
|---|---|---|---|
| DE | 1200071 | B | 9/1965 |
| DE | 2915620 | A | 10/1980 |
| FR | 1146128 | A | 11/1957 |
| FR | 1303925 | A | 1/1963 |

OTHER PUBLICATIONS

Fluid Power Circuits Explained, 1995 by Bud Trinkel, HYPN Educational Books, Ltd., Newburg, IN, USA.*
Gerotor Rotary Flow Divider, George Morgan et al, 1991 International Winter Meeting, The American Society of Agricultural Engineers, Dec. 17–20, 1991, Chicago Illinois.*

* cited by examiner

*Primary Examiner*—Edward K. Look
*Assistant Examiner*—Michael Leslie
(74) *Attorney, Agent, or Firm*—Jeffrey D. Myers

(57) ABSTRACT

A hydraulic installation comprising a hydraulic motor for linearly or rotatively moving against a load, a first connection with a source of pressurized hydraulic fluid of mainly constant high pressure, a second connection with a source of pressurized hydraulic fluid of mainly constant low pressure, a hydraulic transformer for transforming a flow of hydraulic fluid of a first pressure into a flow of hydraulic fluid of a second pressure and connected to the first connection and the second connection and at least one connecting line connecting the hydraulic motor and the hydraulic transformer, the hydraulic transformer comprising a housing, a rotor freely rotatable in the housing, chambers in the rotor with means for changing the volume of the chambers between a minimum and a maximum value during a full rotation of the rotor and means for alternately connecting each chamber with the first connection, the second connection and the connecting line, and wherein the hydraulic motor and the hydraulic transformer are combined into a single unit connected to the first and the second connection.

7 Claims, 7 Drawing Sheets

ω

ω

HYDRAULIC INSTALLATIONS

Figure 1:
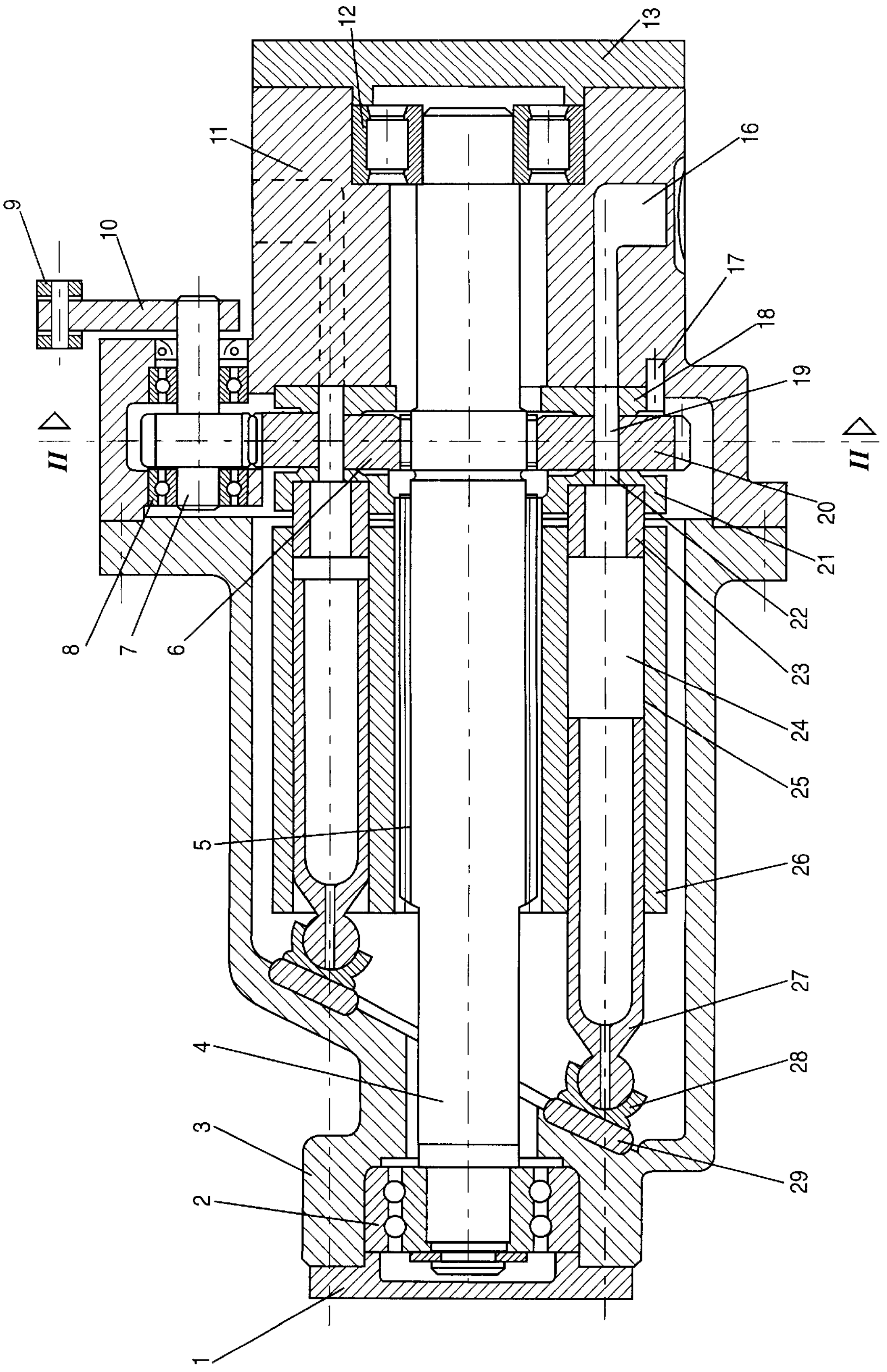

This application is a continuation of Ser. No. 09/125,337 filed Mar. 10, 1999 now U.S. Pat. No. 6,116,138, , which is 371 of PCT/NL97/00084 filed Feb. 24, 1997.

The invention relates to a hydraulic installation in accordance with the preamble of claim 1.

The hydraulic installation is known from the handbook "Hydrostatische Antriebe mit Sekundarregelung" von Mannesmann Rexroth GmbH, pages 143–146. The disadvantage of the known installation is that the hydraulic transformer and the hydraulic motor are connected by pressure lines with an elastic oil column which influences the stability of the installation negatively. Also the separate units involve more costs.

According to the invention the installation is in accordance with the characterizing part of claim 1. In this way a more stable and cost effective installation is obtained.

In accordance with an improvement the hydraulic installation is in accordance with claim 2. In this way the motor is controlled in a simple way without the further requirement of separate valves.

In accordance with another improvement the hydraulic installation is in accordance with claim 3. In this way in a simple cost effective hydraulic transformer is made.

In accordance with a further improvement the hydraulic installation is in accordance with claim 4. Using the rotation of the faceplate for controlling the motor makes it possible with simple means to react quickly on changes in the load.

In accordance with a further improvement the hydraulic installation is in accordance with claim 5. In this way the control of the speed of the motor is measured in a simple way.

In accordance with a further improvement the hydraulic installation is in accordance with claim 6. These control means control the movement of the faceplate and thereby the load on the hydraulic motor in a simple way.

In accordance with a further improvement the hydraulic installation is in accordance with claim 7. In this way the control of the movement and the load of the hydraulic motor is possible.

Figure 2:
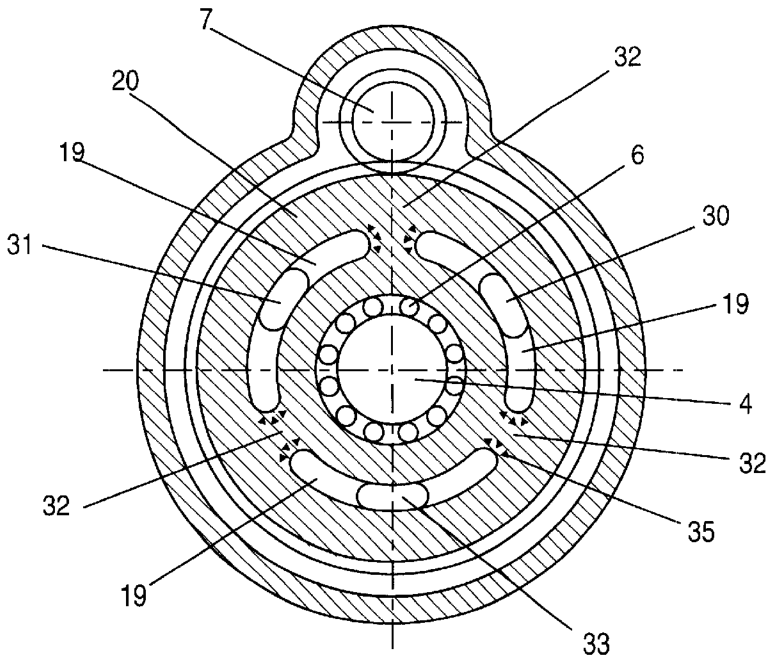
Figure 3:
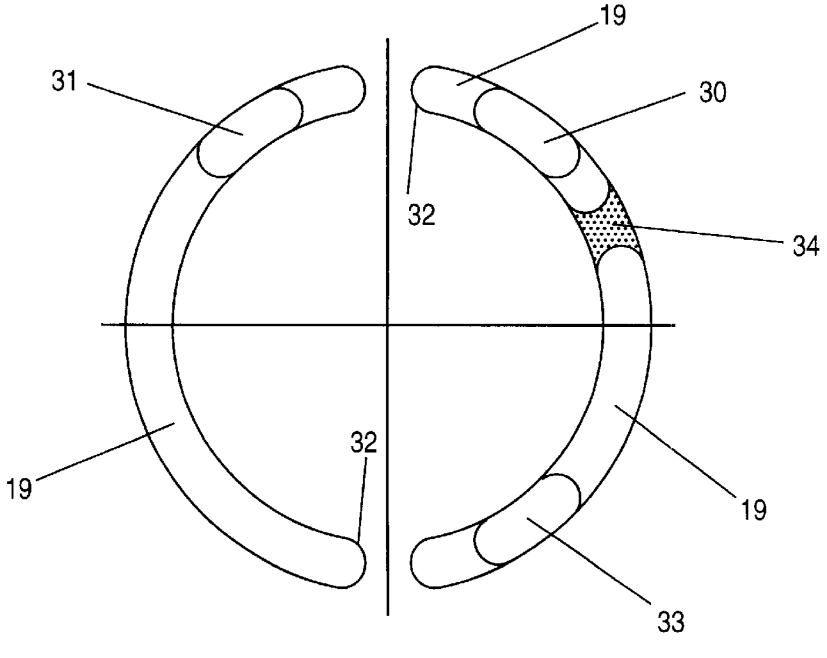
Figure 4:
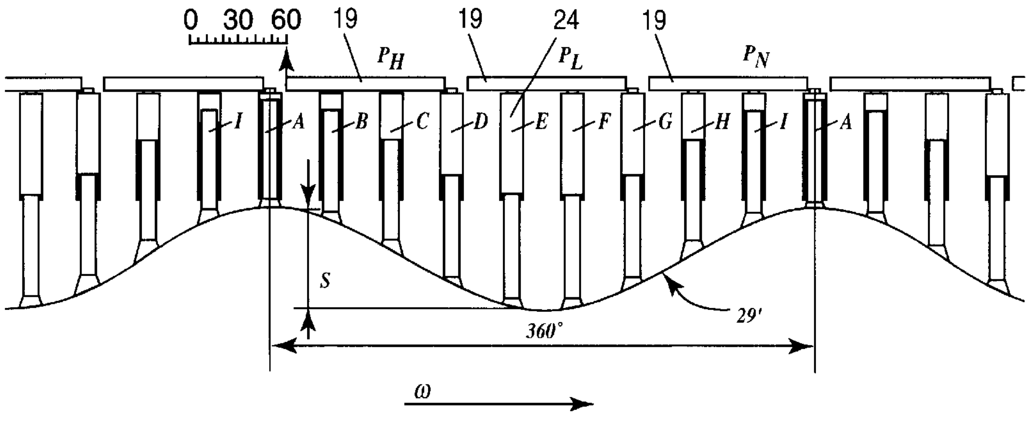
Figure 5:
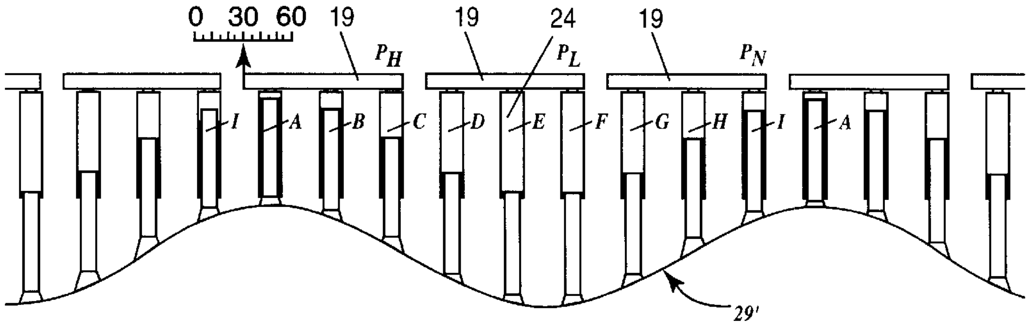
Figure 6:
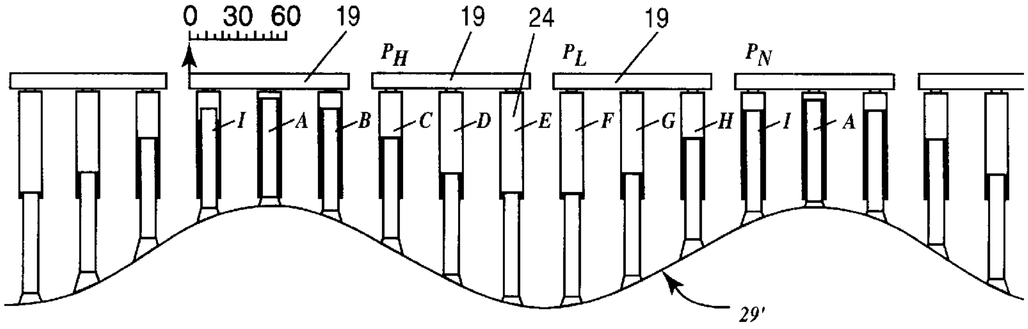
Figure 7:
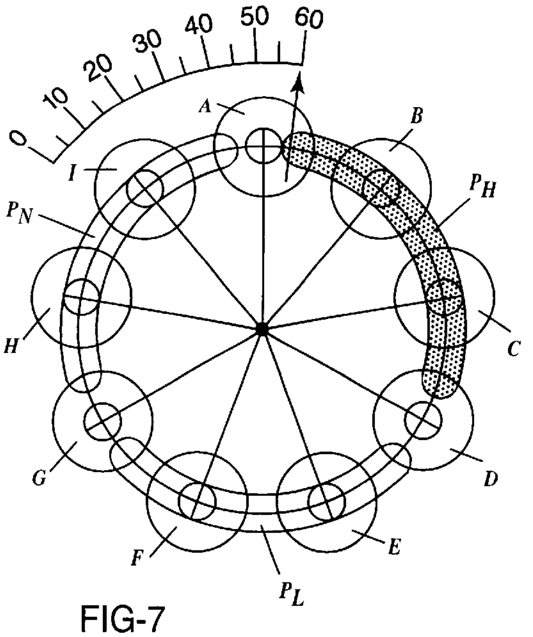
Figure 8:
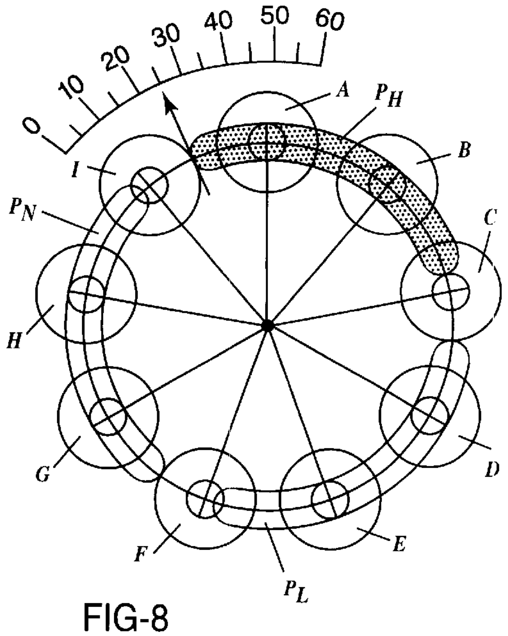
Figure 9:
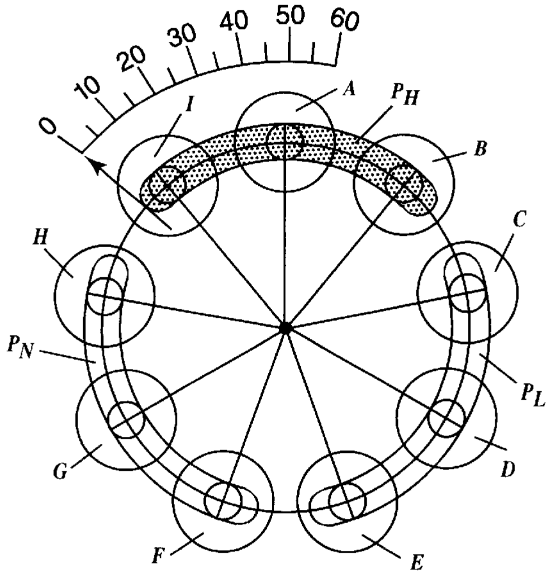
Figure 10:
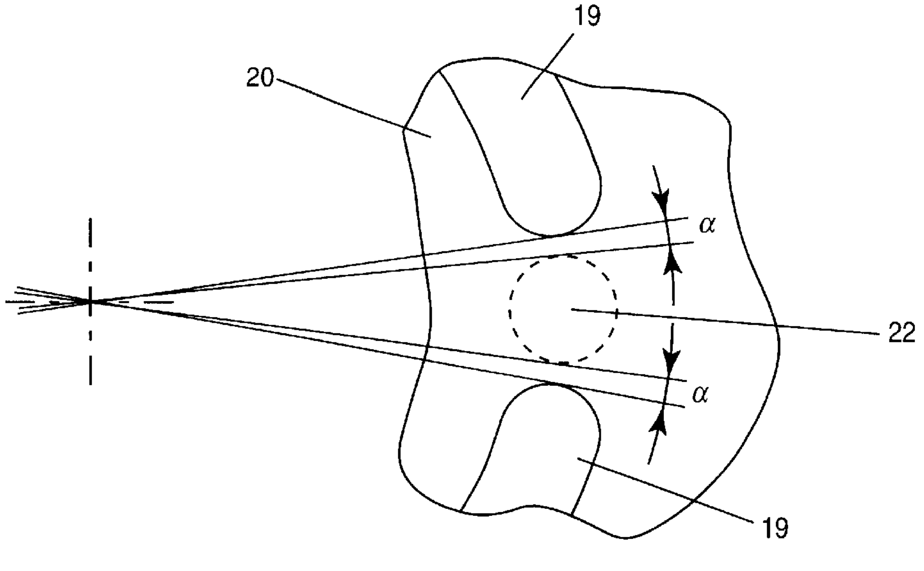
Figure 11:
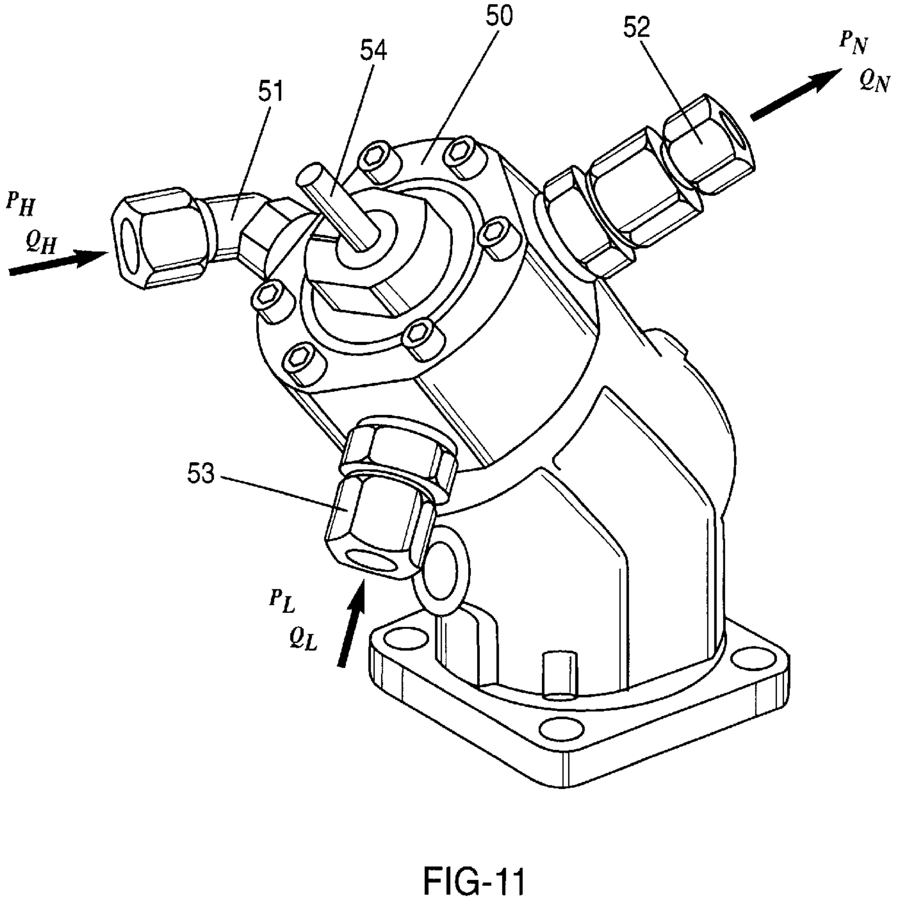
Figure 12:
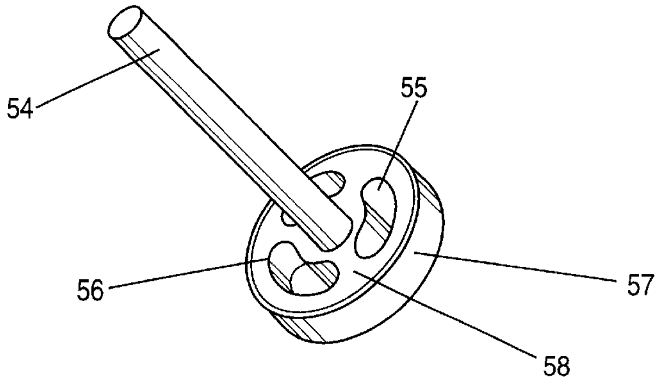
Figure 13:
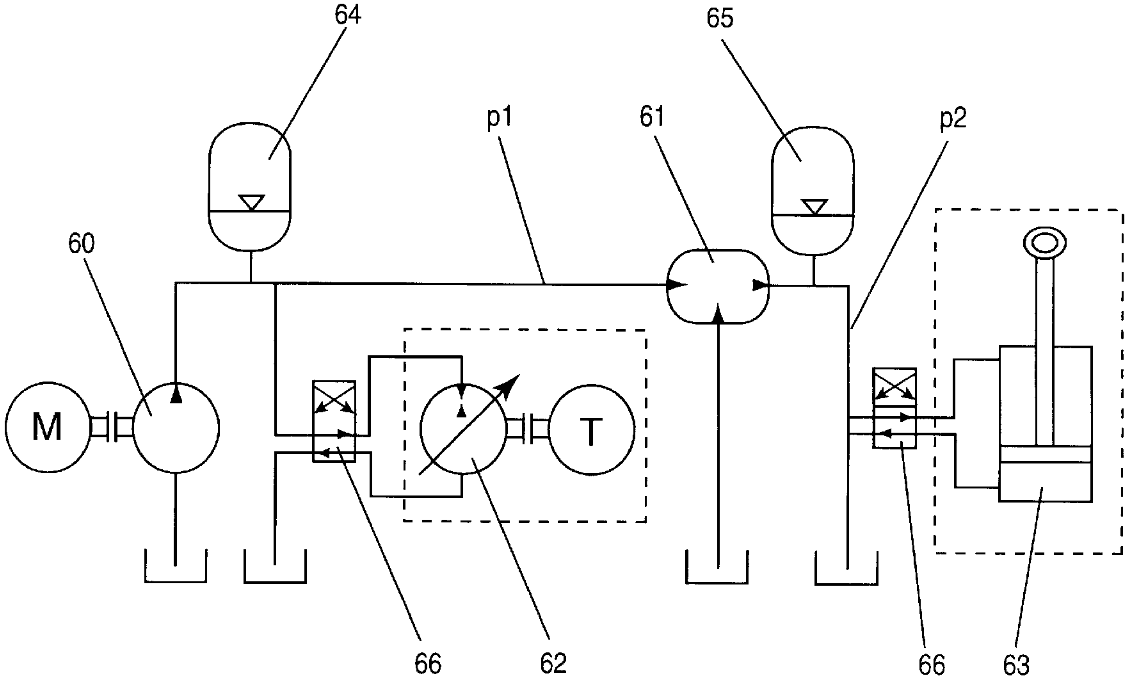
Figure 14:
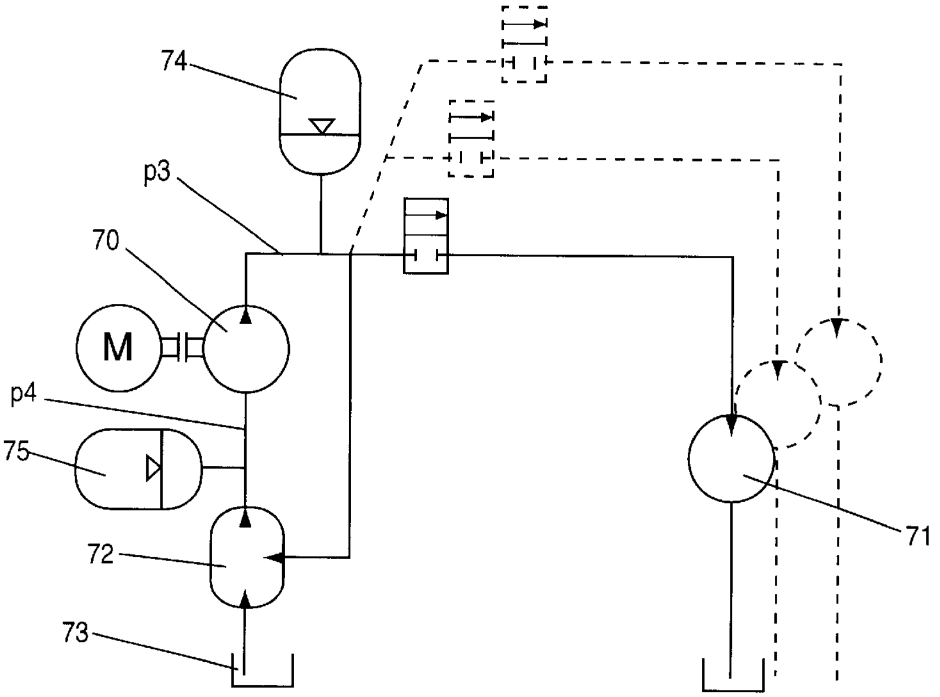

The invention will be elucidated in the specification below, describing a few examples of embodiments with reference to the drawing, in which:

FIG. 1 show a schematic cross-section of a first embodiment of the pressure transformer in accordance with the invention, FIG. 2 shows the section II—II of the pressure transformer in accordance with FIG. 1, FIG. 3 shows an alternative embodiment of the valves in accordance with FIG. 2, FIG. 4 shows schematically the chamber volumes of the pressure transformer in accordance with FIG. 1 with the high pressure and the effective pressure being more or less the same, FIG. 5 shows schematically the chamber volumes of the pressure transformer in accordance with FIG. 1 with the high pressure being higher than the effective pressure, FIG. 6 shows schematically the chamber volumes of the pressure transformer in accordance with FIG. 1 with the effective pressure and the low pressure being more or less the same, FIGS. 7, 8 and 9 show schematically how the chambers are connected with the various compressed air connections in the situations shown in the FIGS. 4, 5 and 6 respectively, FIG. 10 shows schematically the dimensions of the rib between the openings in the face plate in accordance with FIG. 2, FIG. 11 shows a perspective view of a second embodiment of a pressure transformer in accordance with the invention, FIG. 12 shows a perspective view of the face plate of the pressure transformer in accordance with FIG. 11, FIG. 13 shows a pipe diagram of the hydraulic system with a pressure transformer for the decrease of the pressure, and FIG. 14 shows a pipe diagram of the hydraulic system with a pressure transformer for the increase of the pressure.

Figure 15:
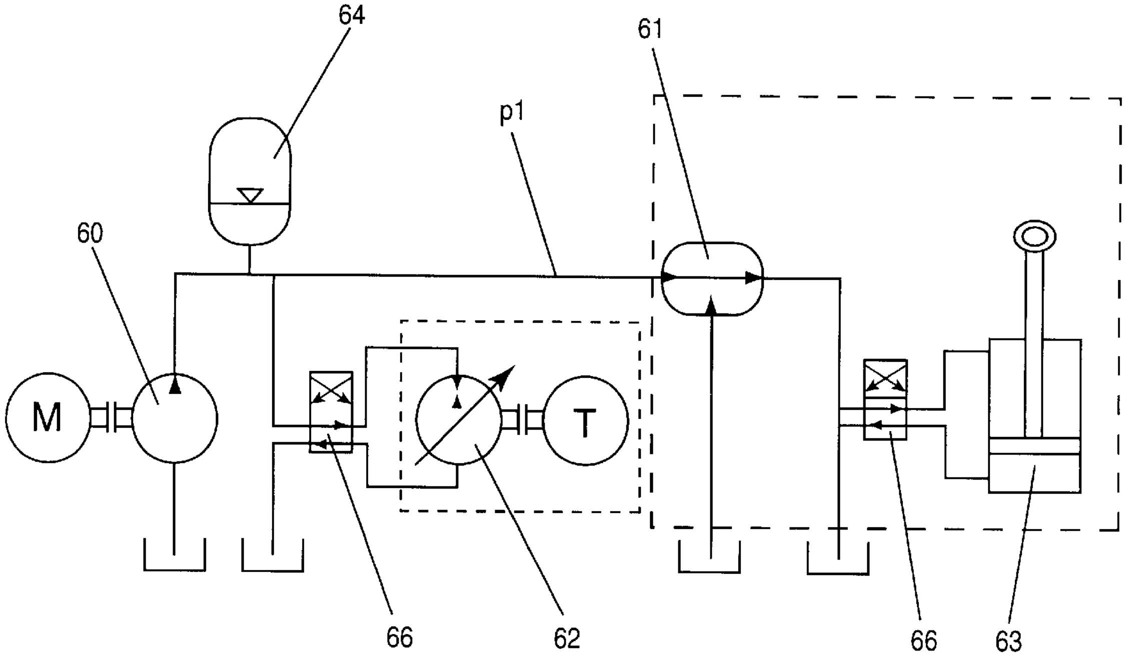

FIG. 15 shows a pipe diagram of the hydraulic system of FIG. 13 with combined pressure transformer and hydraulic motor.

Identical parts in the drawing are indicated as much as possible by corresponding reference numbers.

FIG. 1 shows a first embodiment of a pressure transformer. A shaft 4 is supported by a bearing 2 and a bearing 12. The bearing 2 is fixed in a housing by means of a lid 1, the bearing 12 is fixed in a housing by means of a lid 13. The housing 3 and the housing 11 are assembled in the known manner. The shaft 4 is provided with key toothing 5 with which a rotor 26 and a rotating sealing plate 21 are connected such as to be slidable in the direction of the shaft 4.

The rotor 26 is provided with nine cylinder bores 25 in which a sealing plug 23 is provided between the rotating sealing plate 21 and the rotor 26. Each bore 25 is provided with a piston 27 which has a piston shoe 28 set on a tilting plate 29. The piston 27 together with the bore 25 form a volume-variable pump chamber 24 connected by means of a channel 22 with an opening 19 in the face plate 20. The face plate 20 is provided with three openings 19, each connecting to an opening in a stationary sealing plate 18 fixed in the housing 11 and having a key peg 17 to ensure that each of the three openings in the stationary sealing plate 18 are positioned for a pressure connection 16.

The face plate 20 is rotatably attached to the shaft 4 by means of a bearing 6. The circumference of the face plate 20 is provided with toothing engaging the toothing on a pinion shaft 7. The pinion shaft 7 is mounted in bearings 8 and can be rotated by means of a lever 10 which is movable by means of an adjusting mechanism 9. As can also be seen in FIG. 2, the openings 19 are separated from each other by a rib 32, the first opening 19 being connected with a high-pressure channel 30, the second opening 19 to an effective-pressure channel 31 and the third opening 19 to a low-pressure channel 33.

Furthermore, the appliance incorporates all the known measures and construction details known from conventional hydraulic components such as pumps. This involves, for instance, the measures necessary for greasing and leak-off oil drainage. Sealing at the face plate 20 between the rotor 21 and the housing is also carried out in the usual manner.

In order to keep the rate of flow in the channels 30,31 and 33 as low as possible the area of the opening 19 at the side of the compressed air connection 16 is larger than at the side of the pump chambers 24. This can be done in the manner shown in FIG. 2 at 35, by narrowing the rib 32 at the side of the compressed air connection 16 plus the openings may optionally be widened.

FIG. 3 shows an alternative embodiment of the face plate 20, in which instead of rotating the face plate 20, a movable rib 34 is used.

In the embodiment shown in FIG. 1, the shaft 4 may be connected in the conventional manner with a sensor (not shown) measuring the direction and rate of the rotor's rotation, which data are processed in a control (not shown) and which controls the position of the face plate 20. The control of the pressure transformer functions such that the energy supplied to the rotor 26, that is to say the product of pressure and volume flow, corresponds with the energy taken from the rotor 26, possibly of a different pressure and volume flow, the difference in the volume flow being supplied or removed via a third, usually low pressure level. For this purpose the forces exerted on the rotor must be in balance, similarly, the mass balance of the fluid flows must be appropriate, both depending on the adjustment of the face plate.

FIGS. 4 to 9 show the various situations of employment of the pressure transformer with the relevant adjustments of the face plate 20 and the openings 19, where in FIGS. 4 and 7 an effective pressure $P_N$ and a high pressure $P_H$ are about the same, in FIGS. 5 and 8 the effective pressure $P_N$ is lower than the high pressure $P_H$ and in the FIGS. 6 and 9 the effective pressure $P_N$ is about the same as a low pressure $P_L$. The two pump chambers 24 are indicated by A–I, while the line 29' indicates the influence of the tilting plate 29 on the volume of the pump chamber 24 and s a maximum stroke. The direction of movement ω indicates the movement of the pump chamber 24 along the tilting plate 29 when oil is supplied at the $P_N$ side. One can see how with the same compressed air connection the volume of the pump chambers 24 can both increase and decrease, this can be regulated by adjusting the face plate 20. This is shown, for instance, in FIG. 11 at the high-pressure connection $P_H$, where with the direction of movement ω, the volume of the pump chamber 24 decreases at I to the minimum value at A, and subsequently increases.

In FIG. 10 face plate 20 is drawn with the rib between the openings 19. As shown, the rib is larger than the diameter of the chamber opening 22, so that during a small portion of the rotation, being in total twice an angle α, the chamber is sealed. This angle α measures preferably 0.5 degrees in order to prevent hydraulic transient and cavitation. For special applications this angle α may be increased to about 1 degree.

In the first embodiment of the pressure transformer discussed above, pistons are movable in a cylinder and they move in the direction parallel to the rotation shaft. The invention can also be applied in other configurations of pistons and cylinders such as, for instance, where the piston's direction of movement forms an angle with or runs perpendicular to the rotation shaft. It is also possible to have the pistons and cylinders move eccentrically in relation to each other.

The face plate shown in the embodiment is provided with three openings and there are three compressed air connections. In special applications it is also possible to use the four or more compressed air connections, there will then also be more openings.

Instead of the face plate having three openings it is also possible to apply multiples of three, such as six openings. Instead of the face plate there are also other possibilities for sealing the channels to the pump chambers, such as, for instance, by means of electrically operated valves which are controlled by the rotation of the rotor.

In the respective embodiment the pistons are moved in and out of the pump chambers by means of a tilting plate. There are also embodiments of the pressure transformer, in parallel with the various embodiments existing of hydraulic pumps, in which the pistons are moved by means of cam disks or by a forced movement between the housing and the rotor.

Apart from the appliances in which use is made of pistons and cylinders, the invention is also applicable when the volume of the pump chambers is varied by other means. In this regard one might consider pressure transformers with pump chambers similar to the chambers used in vanes pumps.

FIG. 11 shows a pressure transformer 50 in which the pistons and the rotor containing the pump chambers rotate around different shafts so that the volume of the pump chambers varies when the rotor rotates. The rotation position of the face plate in relation to the housing can be adjusted with the aid of a shaft 54, thereby adjusting the pressure balance in the pressure transformer. The pressure transformer is provided with a high-pressure connection 51, where a fluid flow $Q_H$ flows into the pressure transformer under a pressure $P^H$. A fluid flow $Q_N$ leaves the pressure transformer under a pressure of $P_N$ at an effective compressed air connection 52. The energy contents of both flows is the same, therefore if $P_H > P_N$ then $Q_H < Q_N$. The difference between the two fluid flows is supplied at the low-pressure connection 53 at a pressure of $P_L$ and a fluid flow $Q_L$, so that $Q_L = Q_N - Q_H$. The pressure ratios are adjusted by rotation of the shaft 54. This shaft can be moved by means of a control system; it is also possible to maintain a fixed setting, so that the pressure ratio between $P_H$, $P_N$ and $P_L$ is fixed.

FIG. 12 shows the kind of face plate 57 used in the pressure transformer 50 in FIG. 11. The face plate is provided with three openings 55 separated by ribs 58 having a sealing edge 56. The face plate can be rotated around its axis by means of the shaft 54.

FIG. 13 shows an application of a pressure transformer 61. By means of a pump 60, oil is brought up to a pressure p1, p1 being for instance, 400 bar. This pressure is particularly suitable for a hydraulic motor 62 which can be operated by means of a valve 66 and/or by means of the adjustment of the stroke volume which may be available in the motor. Fluctuations in the oil pressure are absorbed by an accumulator 64. A linear drive 63 is suitable for a maximum pressure p2, p2 being for instance 180 bar. The linear drive 63 is operated by a valve 66 and an accumulator 65 is provided for the absorption of pressure fluctuations in the pressure p2. To lower the pressure p1 to p2, a pressure transformer 61 is applied, which pressure transformer may have a fixed setting, and may react without any further control to the fluid flow taken up by the linear cylinder. If the cylinder rate has to remain within certain limits, the pressure transformer 61 may be provided with a control.

FIG. 14 shows another application of a pressure transformer 72. Herein a high-speed pump 70 has a suction pressure p4 and an outlet pressure p3. The suction pressure p4 always has to be higher than a certain value, for instance 5 bar, as otherwise cavitation will develop in the pump 70. The suction pressure p4 is provided by a pressure transformer 72 which ensures that the pressure p3 is converted into said suction pressure p4 with oil being supplied from a tank 73. A small accumulator 75 is placed between the pump 70 and the pressure transformer 72 to level out the pressure fluctuations. Several users 71 can be accommodated at the pressure side of the pump, while the pressure transformer 72 can also react to the changing volume flow if the pump has a controllable delivery. Between the pump 70 and the pressure transformer 72 an accumulator 74 is placed.

Another application is lifting a variable load by means of a hydraulic cylinder to which the energy is supplied under a constant high pressure and used under a varying pressure. By measuring this pressure and the rotor's 26 direction of rotation by means of a sensor, the setting of the face plate 20 may be calculated in regard to the desired movement. It is also possible after reversal of the direction of movement, to reconvert the energy released through the effect of the load into a higher pressure than the pressure prevailing in the hydraulic cylinder and to recover said energy for reuse.

In the embodiments described above, the pressure transformer has always been presented as a separate unit. In connection with saving expenses and improving the adjustment performance and possible instability, the pressure transformer may be combined with a hydraulic motor. This improves the ability to accommodate load fluctuations, while at the same time the different hydraulic motors are, linearly or rotatingly, connected with a fluid network having a constant high pressure. FIG. 15 shows the embodiment of FIG. 13 with combined pressure transformer 61 and hydraulic motor 62.

What is claimed is:

1. Hydraulic installation comprising a hydraulic motor for linearly or rotatively moving against a load, a first connection with a source of pressurized hydraulic fluid of mainly constant high pressure, a second connection with a source of pressurized hydraulic fluid of mainly constant low pressure, a hydraulic transformer for transforming a flow of hydraulic fluid of a first pressure into a flow of hydraulic fluid of a second pressure and connected to the first connection and the second connection and at least one connecting line connecting the hydraulic motor and the hydraulic transformer, the hydraulic transformer comprising a housing, a rotor freely rotatable in the housing, chambers in the rotor with means for changing the volume of the chambers between a minimum and a maximum value during a full rotation of the rotor and means for alternately connecting each chamber with the first connection, the second connection and the connecting line, and wherein the hydraulic motor and the hydraulic transformer are combined into a single unit connected to the first and the second connection.

2. Hydraulic installation according to claim 1 wherein the hydraulic transformer is provided with adjusting means for controlling the hydraulic motor.

3. Hydraulic installation according to claim 1 wherein the means for alternately connecting each chamber comprises a faceplate with openings.

4. Hydraulic installation according to claim 3 wherein the hydraulic transformer comprises adjusting means for rotating the faceplate.

5. Hydraulic installation according to claim 3 wherein control means are provided for controlling the rotative position of the faceplate.

6. Hydraulic installation according to claim 5 wherein a sensor for measuring the speed and direction of rotation of the rotor is connected to the control means, and wherein the hydraulic transformer comprises the sensor.

7. Hydraulic installation according to claim 1 wherein the hydraulic transformer comprises a sensor for measuring the speed and direction of rotation of the rotor.

* * * * *